United States Patent
Fukui et al.

(10) Patent No.: US 7,363,040 B2
(45) Date of Patent: Apr. 22, 2008

(54) INTERFERENCE AVOIDING RADIO TRANSMISSION UNIT

(75) Inventors: Kiyoshi Fukui, Mie (JP); Yasutaka Kawamoto, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 499 days.

(21) Appl. No.: 11/080,899

(22) Filed: Mar. 16, 2005

(65) Prior Publication Data

US 2005/0233703 A1 Oct. 20, 2005

(30) Foreign Application Priority Data

Mar. 31, 2004 (JP) ............................. 2004-105778

(51) Int. Cl.
*H04Q 7/20* (2006.01)
(52) U.S. Cl. ...................... 455/454; 455/63.1; 370/447
(58) Field of Classification Search ................ 455/454, 455/434, 515, 63.1, 67.11, 456.1; 370/338, 370/445, 447, 448
See application file for complete search history.

(56) References Cited

U.S. PATENT DOCUMENTS

2003/0120809 A1* 6/2003 Bellur et al. ................ 709/239
2004/0137915 A1* 7/2004 Diener et al. ............. 455/456.1
2006/0029073 A1* 2/2006 Cervello et al. ............ 370/389
2006/0251098 A1* 11/2006 Morioka ..................... 371/432
2007/0047570 A1* 3/2007 Benveniste ................. 370/448

FOREIGN PATENT DOCUMENTS

| JP | 09-162798 | 6/1997 |
| JP | 2001-237720 | 8/2001 |

* cited by examiner

*Primary Examiner*—Nguyen Vo
(74) *Attorney, Agent, or Firm*—Venable LLP; Michael A. Sartori; Catherine M. Voorhees

(57) ABSTRACT

An object of this invention is to avoid interfering from a radio LAN transmission unit and being interfered. This invention relates a radio transmission unit for transmitting according to a second radio transmission system which transmits/receives data signal under the same frequency band as first radio transmission system in which prior to transmitting of the data signal, a transmitting station transmits a transmission request signal while a reception station receiving this RTS sends back a reception preparation completion signal. This radio transmission unit comprises CTS transmitting means for transmitting CTS according to the first radio transmission system and a duration setting circuit for setting a duration time to be overlaid on the CTS, and prior to transmitting according to the second radio transmission system, the duration time set by the duration setting circuit is overlaid on the reception preparation completion signal according to the first radio transmission system.

12 Claims, 10 Drawing Sheets

FIG.3

(a) | FRAME CONTROL | DURATION | RECEPTION STATION ADDRESS | TRANSMISSION STATION ADDRESS | FCS |

(b) | FRAME CONTROL | DURATION | RECEPTION STATION ADDRESS | FCS |

INTERFERENCE AVOIDING RADIO TRANSMISSION UNIT

CROSS REFERENCE TO RELATED APPLICATIONS

The disclosure of Japanese Patent Application No. JP2004-105778, filed Mar. 31, 2004, entitled "RADIO TRANSMISSION UNIT, RADIO TRANSMISSION SYSTEM AND TRANSMISSION TIMING ADJUSTING DEVICE". The contents of that application are incorporated herein by reference in their entirety.

BACKGROUND OF THE INVENTION

1. Field of the Invention

The present invention relates to a radio transmission unit having a control circuit for avoiding an interference from a first radio transmission system, provided in a second radio transmission system, which communicates with the first radio transmission system through the same frequency band, capable of avoiding a hidden terminal problem by exchanging a transmission request signal (RTS) and reception preparation completion signal (CTS), and a radio transmission system and a transmission timing adjusting device.

2. Description of the Related Art 2.4 GHz frequency band is a band permitted for transmission without license and currently, various transmission types have been standardized and made available. For example, IEEE802.11 series radio LAN and Bluetooth is available. Of them, radio LAN is one of very prevalent transmission types, which secures a relatively long transmission distance and a high transmission speed.

Some of various types of radio transmission systems considered in recent years require energy saving transmission method. As an example of the energy saving transmission systems, there is a radio transmission system described in Japanese Patent Laid-open Publication No. 09-162798 as a conventional technology. In this radio transmission system, one main station (described as base station in Japanese Patent Laid-open Publication No. 09-162798) communicates with plural subsidiary stations (described as mobile stations in Japanese Patent Laid-open Publication No. 09-162798). According to this system, the main station transmits a beacon signal periodically and after the subsidiary station receives the beacon signal, a predetermined period turns to a period which allows the subsidiary station to transmit and then it communicate with the main station in that period. The subsidiary station operates intermittently so that its transmission circuit activates only in the communication allowed period, synchronizing with the beacon signal so as to suppress consumption power.

In the 2.4 GHz band radio transmission system also, standardization about the energy saving radio transmission system using a method for operating the transmission circuit intermittently synchronous with the beacon signal transmitted periodically as described in the Japanese Patent Laid-open Publication No. 09-162798 as the conventional technology has been progressed. Further, according to this standard system, the transmission distance is suppressed to a shorter distance than the radio LAN in order to establish an energy saving transmission system.

In such 2.4 GHz band, plural different radio transmission systems can be used. Thus, if plural radio transmission systems using different radio transmission methods are used at the same place, there is such a problem that the transmission quality of each transmission system may deteriorate due to interference between those transmission systems.

According to the radio transmission system described in the Japanese Patent Laid-open Publication No. 2001-237720, to solve this problem, by measuring interfering electric power from a different transmission system and inhibiting transmission from a self terminal during receiving of the interfering wave, being interfered by other transmission system and interfering other transmission system are avoided.

However, according to the interference avoiding method described in the Japanese Patent Laid-open Publication No. 2001-237720, during transmission of a signal (interfering wave as viewed from self-transmission system) by other transmission system, transmission of the self-transmission system must be inhibited. That is, a period in which the transmission of the self-transmission system is inhibited is determined depending on transmission timing of other transmission system. For the reason, in a system based on such a method in which the transmission circuit is activated intermittently synchronous with the beacon signal, if the main station is receiving an interfering signal from other system at a time when it transmits the beacon signal, it becomes unable to transmit the beacon signal at a right timing.

Although interference to the self-transmission system can be avoided by executing the interference avoiding method proposed in the Japanese Patent Laid-open Publication No. 2001-237720 on the side of other transmission system to detect the beacon signal transmitted by the self-transmission system while inhibiting transmission during this period, if a transmission distance of the self-transmission system is shorter than the transmission distance of other transmission system, a signal of the self-transmission system reaches only part of terminals which interfere the self-transmission system within the other transmission system. As a result, interference from the other transmission system cannot be avoided completely.

SUMMARY OF THE INVENTION

The present invention has been achieved to solve the above-described problem and the present invention provides a radio transmission unit for transmitting according to second radio transmission system which transmits/receives data signal through the same frequency band as first radio transmission system in which a transmission station transmits a transmission request signal prior to transmitting data signal while a reception station receiving the transmission request signal sends back a reception preparation completion signal, the radio transmission unit comprising: CTS transmitting means for transmitting the reception preparation completion signal based on the first radio transmission system; and duration setting means for setting a duration time to be overlaid on the reception preparation completion signal, wherein prior to starting transmission by the second radio transmission system, the duration time set by the duration setting means is overlaid on the reception preparation completion signal of the first radio transmission system.

The duration setting means adds a time which can be required for pre-treatment for transmitting a reception preparation completion signal according to the first radio transmission system as a margin and corrects the duration time based on a time notified from the CTS transmitting means.

It is possible to select an embodiment in which the RTS transmitting means is used together with the CTS transmitting means instead of the CTS transmitting means.

Other radio transmission unit of the present invention is a radio transmission unit for transmitting according to second radio transmission system which transmits/receives data signal through the same frequency band as first radio transmission system in which a transmission station transmits a transmission request signal prior to transmitting data signal while a reception station receiving the transmission request signal sends back a reception preparation completion signal, characterized in further comprising means for adding information to a signal transmitted by the transmitting station or receiving station for stopping transmission based on the first radio transmission system during transmission operation of data signal according to the second radio transmission system.

Other radio transmission unit of the present invention is a radio transmission unit for transmitting according to second radio transmission system which transmits/receives data signal through the same frequency band as first radio transmission system in which a transmission station transmits a transmission request signal prior to transmitting data signal while a reception station receiving the transmission request signal sends back a reception preparation completion signal, the radio transmission unit being characterized in comprising position information recording means for recording the position information of other radio transmission terminal received by the second radio transmission system, RTS/CTS transmission unit selecting means for selecting a radio transmission terminal for transmitting a transmission request signal and a radio transmission terminal for transmitting a reception preparation completion signal from the position information of other radio transmission terminal recorded by the position information memory means and means for transmitting a signal for instructing start/stop of the transmission operation of a transmission request signal corresponding to selection by the RTS/CTS transmission unit selecting means and a signal for instructing start/stop of the transmission operation of a reception preparation completion signal corresponding to selection by the RTS/CTS transmission unit selecting means.

Other radio transmission unit of the present invention is a radio transmission unit for transmitting according to second radio transmission system which transmits/receives data signal through the same frequency band as first radio transmission system in which a transmission station transmits a transmission request signal prior to transmitting data signal while a reception station receiving the transmission request signal sends back a reception preparation completion signal, the radio transmission unit being characterized in comprising radio transmitting means for transmitting/receiving a signal based on the first radio transmission system, RTS signal processing means for extracting necessary information from a transmission request signal destined for a self-transmission unit in signals received by the first radio transmission system, CTS generating means for generating a reception preparation completion signal to be sent back using information extracted by the RTS signal processing means and transmitting according to the first radio transmission system, means for measuring a distance between the self-transmission unit and other radio transmission terminal, means for selecting a radio transmission terminal for transmitting a transmission request signal depending on the measured distance, and means for transmitting a signal which instructs start/stop of the transmission operation of a transmission request signal depending on the selected radio transmission terminal.

This radio transmission unit can further comprise CTS transmission specifying signal processing means for controlling the operation for sending back a reception preparation completion signal by receiving the signal that instructs start/stop of the sending-back operation of the reception preparation completion signal according to the second radio transmission system.

The radio transmission system can be constructed by combining the aforementioned radio transmission unit. Further, the aforementioned radio transmission unit can be built in an existing radio transmission system.

According to another aspect of the present invention, there is provided a transmission adjusting timing unit. The transmission adjusting timing unit of the present invention comprises a second radio transmission system receiving means capable of operating a transmission unit intermittently synchronous with a beacon signal transmitted according to a determined rule, through the same frequency band as the first radio transmission system in which a transmission station transmits a transmission request signal prior to transmitting data signal while a reception station receiving the transmission request signal sends back a reception preparation completion signal, means for detecting a transmission unit operation period in which the transmission unit needs to be operated from a signal received by the second radio transmission system receiving means, CTS transmitting means for transmitting a reception preparation completion signal based on the first radio transmission system and duration setting means for setting a duration time to be overlaid on the reception preparation completion signal, the transmission adjusting timing unit being characterized in that prior to start of a transmission unit operation period based on the second radio transmission system, time set up by the duration setting means is overlaid on the reception preparation completion signal based on the first radio transmission system.

In the above-mentioned transmission timing adjusting unit, it is permissible to set a time presented by adding a time which can be required for the pretreatment for transmitting a reception preparation completion signal by the first radio transmitting means to a time for the duration setting means to transmit according to the second radio transmission system after transmitting of the reception preparation completion signal, as a margin time.

In the above-mentioned transmission timing adjusting unit, the CTS transmitting means may have a function for notifying the duration setting means of a time consumed in a processing for transmitting a signal before transmitting of the reception preparation completion signal and the duration setting means may have a function for correcting a duration time to be set according to a time notified from the CTS transmitting means.

Other transmission adjusting timing unit of the present invention comprises a second radio transmission system receiving means capable of operating a transmission unit intermittently synchronous with a beacon signal transmitted according to a determined rule, through the same frequency band as the first radio transmission system in which a transmission station transmits a transmission request signal prior to transmitting data signal while a reception station receiving the transmission request signal sends back a reception preparation completion signal, means for detecting a transmission unit operation period in which the transmission unit needs to be operated from a signal received by the second radio transmission system receiving means, RTS transmitting means for transmitting a transmission request signal based on the first radio transmission system and duration setting means for setting a duration time to be overlaid on the transmission request signal, the transmission adjusting timing unit being characterized in that prior to start of a transmission unit operation period based on the second radio transmission system, time set up by the duration setting means is overlaid on the transmission request signal based on the first radio transmission system.

In the above-mentioned transmission timing adjusting unit, it is permissible to set a time presented as a duration time by adding a time which can be required for the pretreatment for transmitting a transmission request signal by the first radio transmitting means to a time for the duration setting means to transmit according to the second radio transmission system after transmitting of the transmission request signal, as a margin time.

In the above-mentioned transmission timing adjusting unit, the RTS transmitting means may have a function for notifying the duration setting means of a time consumed in a processing for transmitting a signal before transmitting of the transmission request signal and the duration setting means may have a function for correcting a duration time to be set according to a time notified from the RTS transmitting means.

According to the present invention, as described above, by transmitting the CTS signal or the like prior to the transmission period, the self-transmission unit and the radio LAN transmission unit located within the radio LAN transmission range operates to inhibit transmission of a signal in the transmission period of the self-transmission unit. Consequently, the self-transmission unit is capable of executing transmission without being interfered by the radio LAN transmission unit.

By building the aforementioned radio transmission unit in an existing radio transmission system, interference can be suppressed without changing the existing radio transmission system.

BRIEF DESCRIPTION OF THE DRAWINGS

FIG. 3 is a configuration diagram showing the frame formats of RTS and CTS;

DETAILED DESCRIPTION OF THE PREFERRED EMBODIMENTS

Hereinafter, the preferred embodiments of the present invention will be described with reference to the accompanying drawings.

The present invention is applicable to a transmission system in which interference can occur because transmission and reception overlap among plural transmission terminals, such as radio LAN and Bluetooth. According to this embodiment, as a transmission system which is an object of interference, the radio LAN will be exemplified.

Prior to description of this embodiment, the structure of the radio LAN which the present invention utilizes will be described.

The radio LAN of this embodiment uses CSMA/CA transmission system as its access system. The CSMA/CA can measure a signal level of desired transmission frequency prior to transmission of data signal and if other station does not transmit, transmit the data signal. If the other station is transmitting, transmission procedure is retired according to a predetermined procedure. Following this procedure prevents data signals transmitted by plural stations at the same time from interfering with each other in the reception station to produce a reception error.

Figure 2:
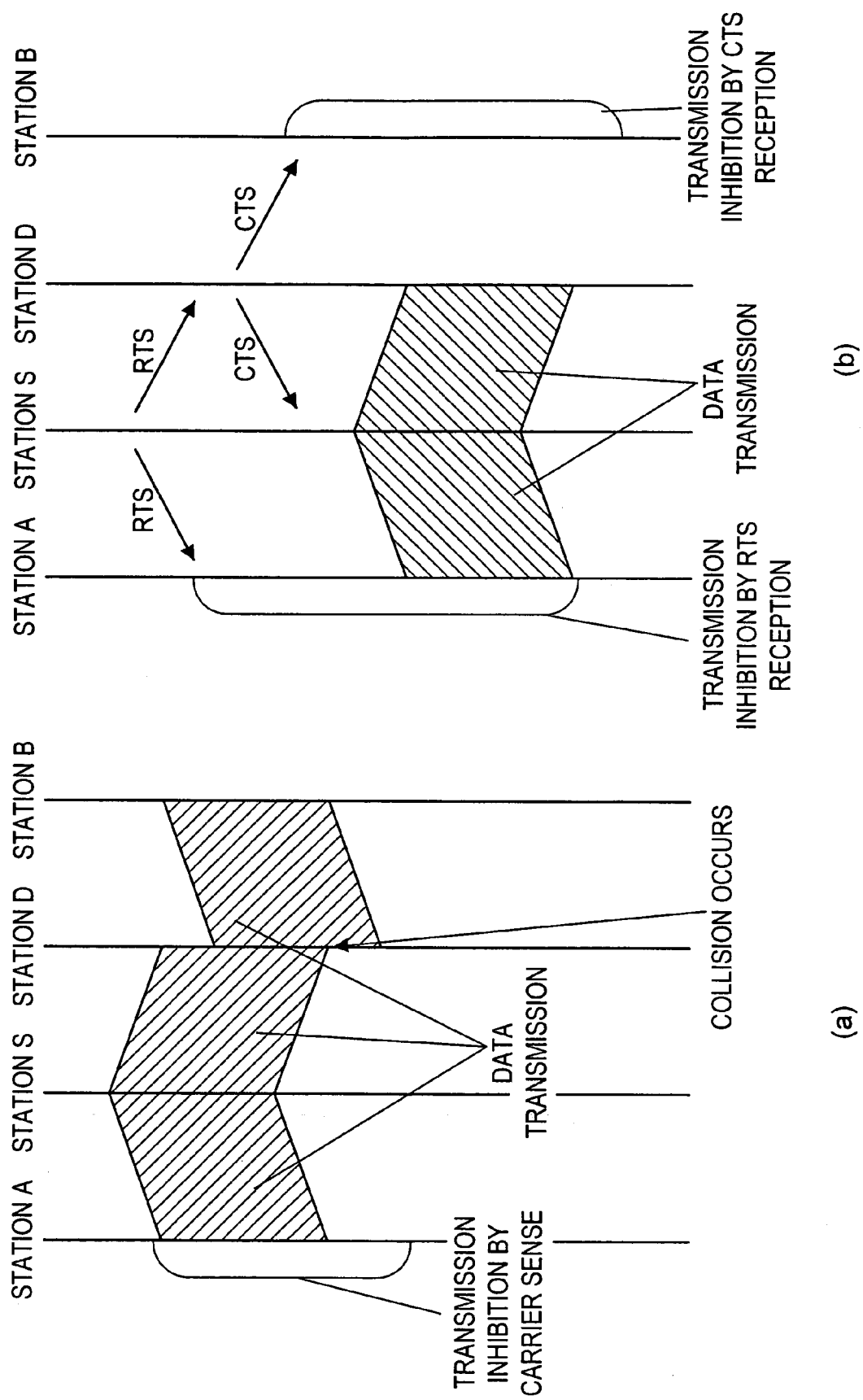
FIG. 2 is an explanatory diagram showing an embodiment in which interference is generated at a reception station.

However, even if the CSMA/CA is used, as shown in FIG. 2(a), interference can occur in the reception station. FIG. 2(a) shows a case where the transmission stations are arranged in the order of A, S, D, and B and the station S transmits data to the station D. Transmission distance is assumed to be a distance between adjoining stations. A signal transmitted by the station S reaches the stations A, D and the station D is capable of receiving the data signal from the station S. On the other hand, the station A recognizes that the station S is transmitting data signal and inhibits transmission from its own terminal. However, because the station B is incapable of receiving data signal transmitted by the station S, it cannot recognize that the station S is transmitting data signal. If the station B starts transmitting data signal while the station S is transmitting data signal to the station D, a signal from the station S and a signal from the station B interfere with each other in the station D, so that the data signal cannot be received properly. A terminal in the status of the station B is called hidden terminal and the problem described above is called hidden terminal problem.

Then, in the radio LAN, prior to transmission of the data signal, by exchanging signals called transmission request signal (RTS) and reception preparation completion signal (CTS) between transmitting stations and receiving stations, the above-described hidden terminal problem is solved. The state in which the above-mentioned hidden terminal problem can be solved by exchanging the RTS/CTS will be described with reference to FIG. 2(b). FIG. 2(b) shows a case where like FIG. 2(a), the transmitting stations are arranged in the order of A, S, D and B and the station S transmits data to the station D. The station S transmits RTS signal prior to transmission of data signal to the station D.

As shown in FIG. 3(a), this RTS has a frame format comprising frame control, duration, receiving station address, transmitting station address and frame check sequence (FCS) and includes information indicating a destination station (station D) of data signal to be transmitted after transmitting the RTS signal and time necessary for transmitting data signal.

The station D as the destination station, after receiving the RTS signal from the station S, returns the CTS signal to the station S. As shown in FIG. 3(b), this CTS signal has the same frame format as the RTS signal except the transmitting station address and contains the same information as the information indicating time necessary for transmitting data signal, contained in the RTS signal. A station (station A) other than the station D of stations which receive the RTS signal from the station S and a station (station B) other than the station S of stations which receive the CTS signal from the station D are inhibited from transmitting a signal from the self stations only during a time until transmission of data signal to be transmitted after that is completed. In the meantime, the time until the transmission of the data signal is completed can be calculated from information contained in the RTS signal or the CTS signal.

By the above-described system for exchanging the RTS/CTS, the ratio LAN is capable of transmitting without any interference among transmitting stations in the system.

First Embodiment

According to this embodiment, by using the CTS signal used to avoid the hidden terminal problem in the radio LAN as described above, being interfered by the radio LAN system can be avoided.

Figure 1:
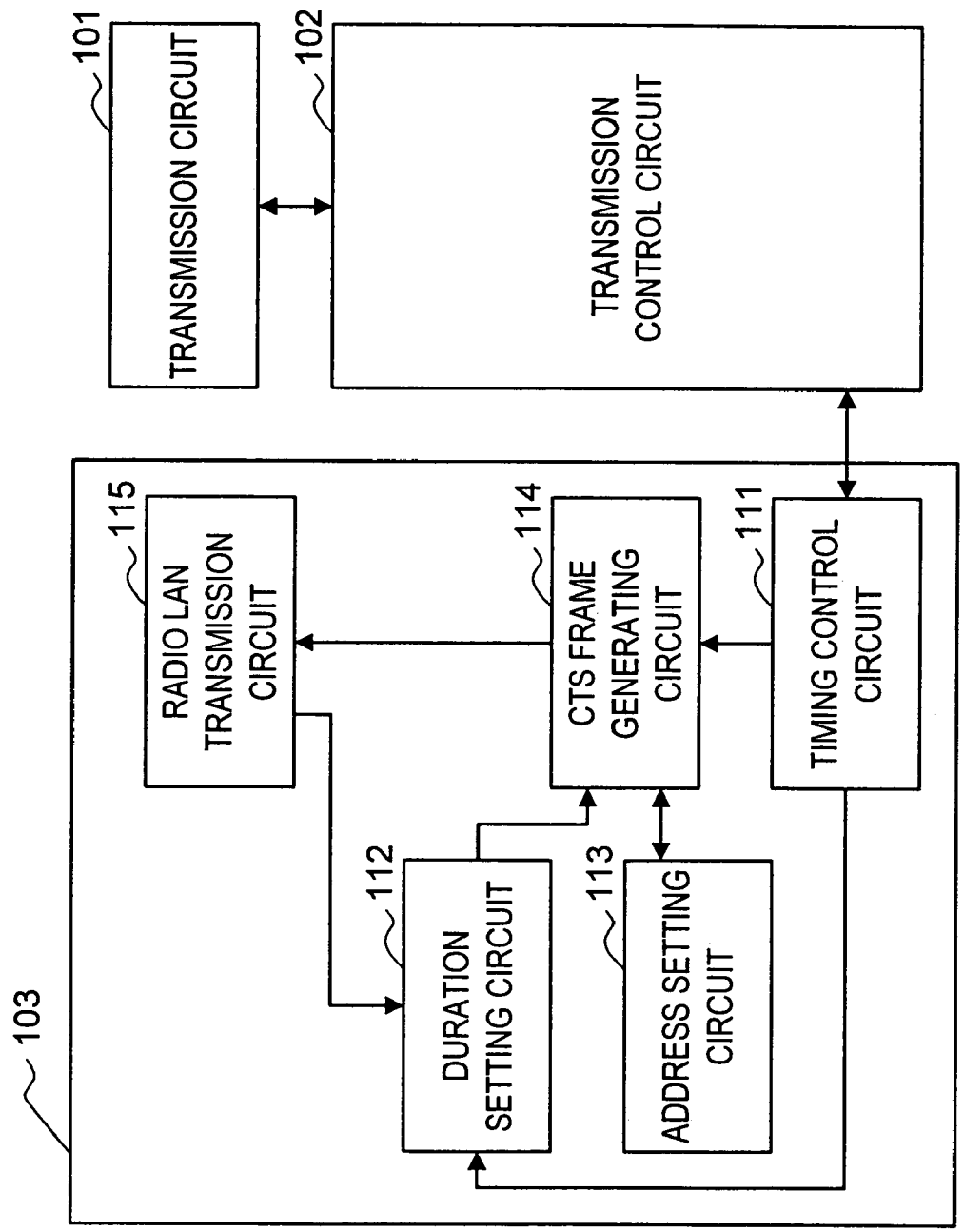
FIG. 1 is a configuration diagram showing a radio transmission apparatus according to a first embodiment of the present invention.

FIG. 1 is a configuration diagram of the radio transmission unit in this embodiment. This radio transmission unit comprises a transmission circuit 101, a transmission control circuit 102 and a to-radio LAN interference control circuit 103. A first radio transmission system for a reception station receiving a transmission request signal to return a reception preparation completion signal is constituted of mainly the to-radio LAN interference control circuit 103. A second radio transmission system for transmitting/receiving data signal through the same frequency band as the first radio transmission system is constituted of the transmission circuit 101 and the transmission control circuit 102.

The transmission circuit 101 is a circuit for transmitting/receiving data with other transmission unit. This transmission circuit 101 has a function for accessing a transmission unit according to the transmission method of its own transmission system to transmit/receive transmission signals.

The transmission control circuit 102 is a circuit for controlling the transmission and reception of data by the transmission circuit 101. This transmission control circuit 102 has a function for creating transmission data and requesting the transmission circuit 101 for transmission and a function for processing data received by the transmission circuit 101. Further, it has a function for notifying the to-radio LAN interference control circuit 103 of a transmission period in which a signal can be transmitted or received by the transmission circuit 101. This transmission period is determined depending on the method. For example, if as a method used by the self-transmission system, the method in which the transmission circuit 101 is operated intermittently synchronous with a beacon signal transmitted by the main station is used, a time in which the transmission circuit 101 is actuated can be assumed to be a transmission period. Further, the period for transmitting a signal with the self-transmission system may be assumed to be the transmission period or a time for receiving data signal from other station can be regarded as the transmission period by estimating from the transmission content of the self-station.

The to-radio LAN interference control circuit 103 is a circuit for avoiding being interfered by the radio LAN system. This to-radio LAN interference control circuit 103 avoids being interfered by the radio LAN system by transmitting the CTS. More specifically, the to-radio LAN interference control circuit 103 comprises a timing control circuit 111, a duration setting circuit 112, an address setting circuit 113, a CTS frame generating circuit 114 and a radio LAN transmission circuit 115.

The timing control circuit 111 is a circuit for controlling the length of transmission period and transmission timing. This timing control circuit 111 notifies the duration setting circuit 112 of the length of a next transmission period following the transmission period of the transmission circuit 101 notified by the transmission control circuit 102 and notifies the CTS frame generating circuit 114 of CTS frame transmission timing. More specifically, a time summing up a time which can be required for the CSMA/CA, a time required for transmission of the CTS signal, and a time required for transmitting data from a self terminal is notified as the length of a next transmission period. Further, by considering the length of this transmission time, a period in which the transmission start time is accelerated is notified as CTS transmission timing.

The duration setting circuit 112 is a circuit for setting the duration based on the length of the transmission period and correction information, notified from the timing control circuit 111 and the radio LAN transmission circuit 115. That is, this duration setting circuit 112 determines the value of a duration field in the CTS frame following the length of the transmission period notified from the timing control circuit 111 and the correction information notified form the radio LAN transmission circuit 115 and notifies the CTS frame generating circuit 114 of that value. More specifically, a time obtained by subtracting a time required until channel access is enabled in the radio LAN transmission circuit 115 from the length of the aforementioned transmission period is determined as the value of the duration field in the CTS frame and notified to the CTS frame generating circuit 114.

The address setting circuit 113 is a circuit for determining the address field of the CTS frame and notifying the CTS frame generating circuit 114. As for the setting of the address field by this address setting circuit 113, for example, the address of the self-station can be set up fixedly.

The CTS frame generating circuit 114 has a function for requesting the radio LAN transmission circuit 115 to transmit the CTS frame signal following a CTS transmission timing notified form the timing control circuit 111 and a function for generating a CTS frame in which set values notified from the duration setting circuit 112 and the address setting circuit 113 in each field and transferring to the radio LAN transmission circuit 115.

The radio LAN transmission circuit 115 has a function for, if it is notified of a CTS frame signal transmission request form the CTS frame generating circuit 114, trying channel access following the CSMA/CA procedure and when channel access is enabled, notifying the duration setting circuit 112 of a time required until the channel access is made for the CSMA/CA procedure, receiving the CTS frame from the CTS frame generating circuit 114 and transmitting that CTS.

Operation

Next, the operation of the radio transmission unit according to this embodiment having the above-described structure will be described.

The radio transmission unit of this embodiment operates as follows as a radio transmission unit of the self-transmission system.

The transmission circuit 101 controls access to the transmission unit following transmission method of the self-transmission system and when it detects a reception signal, transfers reception data to the transmission control circuit 102. The transmission control circuit 102 processes the reception data transferred from the transmission circuit 101 and if necessary, generates transmission data and then, requests the transmission circuit 101 to transmit the transmission data. The transmission circuit 101, if it is requested to transmit data from the transmission control circuit 102, transmits data signal following the transmission method of the self-transmission system.

A following operation by the first radio transmission system is carried out in order to avoid interference with the radio LAN system in parallel with the transmission/reception operation of the second radio transmission system.

The transmission control circuit 102 obtains a transmission period (time for operating the aforementioned transmission circuit 101 and the like) in which the transmission circuit 101 can transmit or receive following the transmission method of the self-transmission system and notifies the timing control circuit 111 of the to-radio LAN interference control circuit 103.

The timing control circuit 111, if it receives a notification of the aforementioned transmission period, obtains a period in which the transmission start timing is accelerated by considering a time which can be required for the CSMA/CA executed prior to the CTS transmission and a time required for the transmission of the CTS signal, notifies the duration setting circuit 112 of the length of this period and notifies the CTS frame generating circuit 114 of a start time of this period as CTS transmission timing.

The CTS frame generating circuit 114, when the CTS frame transmission timing is reached, requests to transmit the CTS frame to the radio LAN transmission circuit 115. The radio LAN transmission circuit 115, if it receives the CTS frame transmission request, tries channel access following the CSMA/CA procedure and when the channel access is enabled, notifies the duration setting circuit 112 of a time required by that time.

The duration setting circuit 112, at the same time as the above-described notification, notifies the CTS frame generating circuit 114 of a value obtained by subtracting the aforementioned time notified from the radio LAN transmission circuit 115 from the length of the period notified from the timing generating circuit 111 as the value to be set in the duration field of the CTS. Further, the address setting circuit 113 always notifies the CTS frame generating circuit 114 of self-address as the value of an address field in the CTS frame. The radio LAN transmission circuit 115 receives a CTS frame in which the values of the duration field and address field are set to the aforementioned values from the CTS frame generating circuit 114 and transmits the CTS.

By receiving this CTS signal from the radio transmission unit of this embodiment, the radio LAN transmission unit located within a radio LAN transmission range operates to inhibit the transmission of signals only in the period indicated by the duration field of the CTS signal. During this period, the self-transmission unit turns into its transmission period so that transmission/reception of signals by the transmission circuit 101 is carried out.

Effect

As described above, the transmission unit of the first embodiment of the present invention operates to inhibit the radio LAN transmission unit located within a transmission range between the self-transmission unit and radio LAN from transmitting a signal within the transmission period of the self-transmission unit by transmitting the CTS signal prior to transmission period and as a consequence, the self-transmission unit is capable of transmitting without being interfered by the radio LAN transmission unit.

Second Embodiment

This embodiment intends to avoid being interfered by the radio LAN system by using the RTS/CTS signal used for avoiding the hidden terminal problem in the radio LAN.

Figure 4:
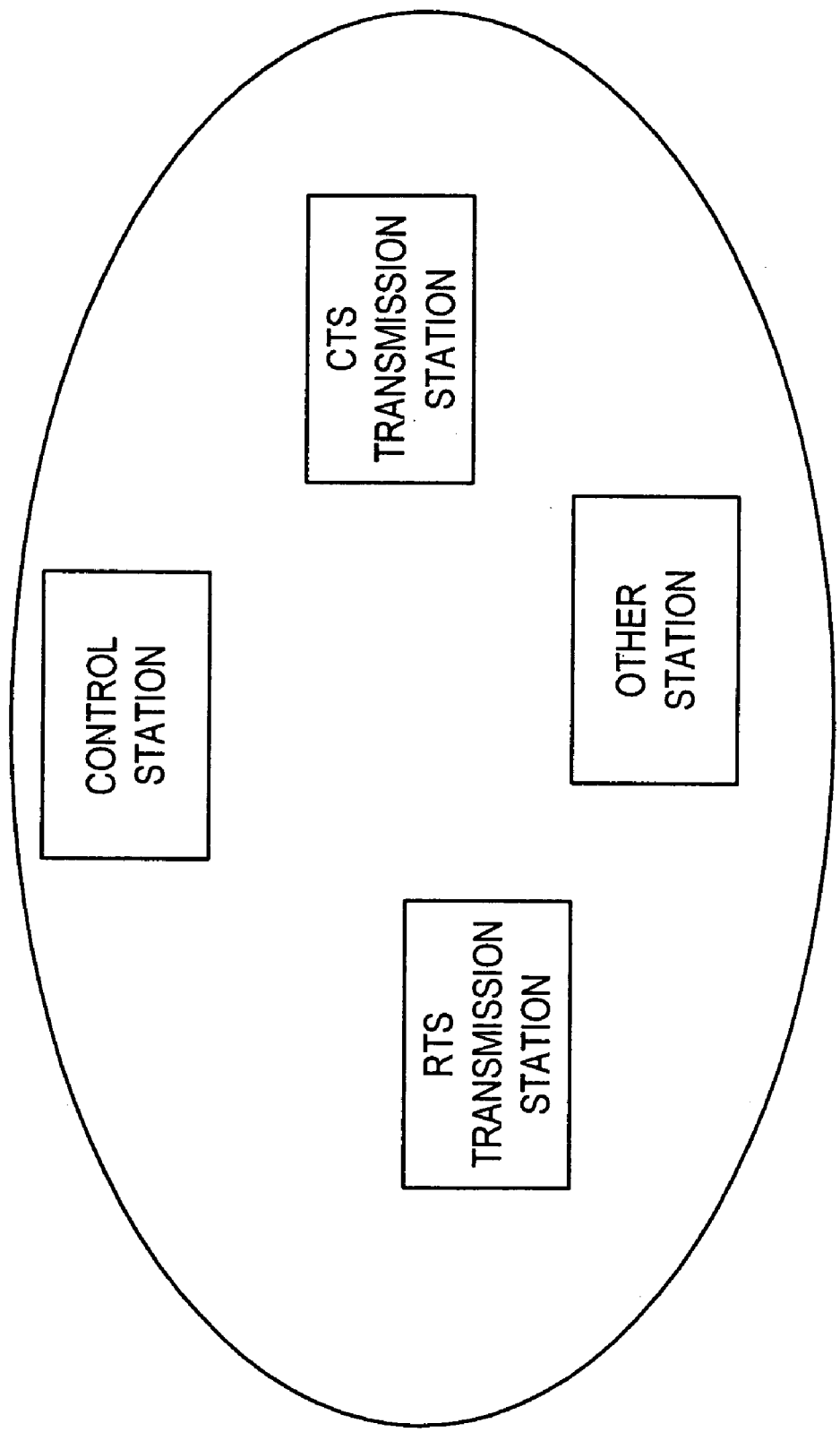
FIG. 4 is a schematic diagram showing transmission system according to a second embodiment.

FIG. 4 shows the configuration of the transmission system according to the second embodiment of the present invention. As shown in FIG. 4, the transmission system of this embodiment is constituted of RTS transmitting station having a function for transmitting RTS as well as transmission/reception function as the self-transmission system, CTS transmitting station having a function for transmitting CTS, a control station for specifying the RTS transmitting station and CTS transmitting station and other station having only a function of self-transmission system.

Figure 5:
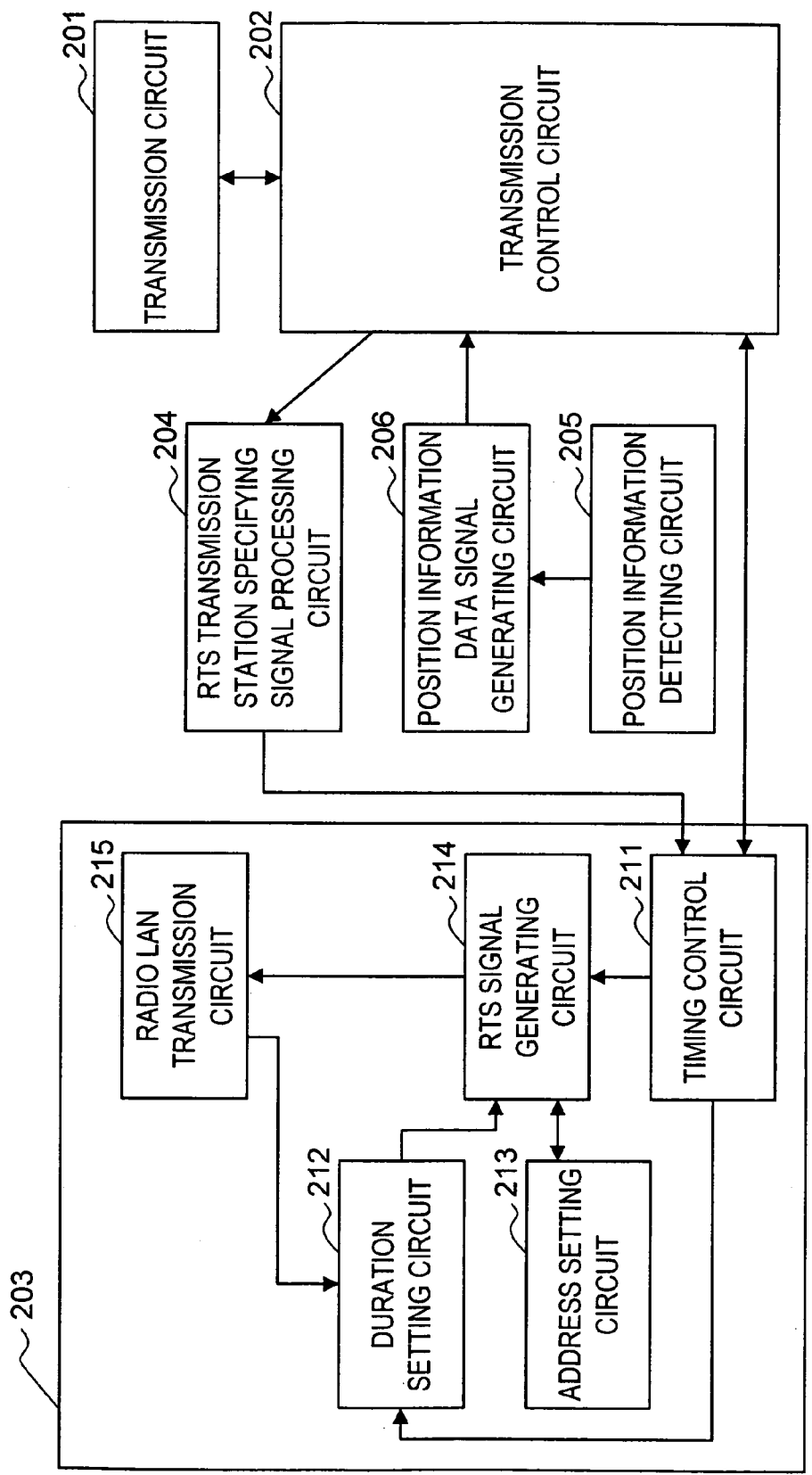
FIG. 5 is a block diagram showing the configuration of RTS transmission station in the transmission system according to the second embodiment.

FIG. 5 shows a configuration diagram of the RTS transmission station in this embodiment. The RTS transmitting station in the Figure is constituted of a transmission circuit 201, a transmission control circuit 202, a to-radio LAN interference control circuit 203, a RTS transmitting station specifying signal processing circuit 204, a position information detecting circuit 205 and a position information data signal generating circuit 206.

The transmission circuit 201 is the same as the transmission circuit 101 in the transmission unit of the first embodiment.

The transmission control circuit 202 has, in addition to the function of the transmission control circuit 102 in the transmission unit of the first embodiment, a function for transferring reception data, especially, RTS transmitting station specifying signal, RTS transmitting station specification releasing signal, and CTS transmitting station specifying signal to a RTS transmitting station specifying signal processing circuit 204 and a function for transferring a signal received from the position information data signal generating circuit 206 to the transmission circuit 201 and making it transmit that data.

The to-radio LAN interference control circuit 203 is constituted of a timing control circuit 211, a duration setting circuit 212, an address setting circuit 213, an RTS frame generating circuit 214 and a radio LAN transmission circuit 215. Of them, the duration setting circuit 212 and the radio LAN transmission circuit 215 are equal to the duration setting circuit 112 and radio LAN transmission circuit 115 in the transmission unit of the first embodiment.

The timing control circuit 211 is almost equal to the timing control circuit 111 in the transmission unit of the first embodiment and different only in that it operates/stops according to an instruction from the RTS transmitting station specifying signal processing circuit 204.

The address setting circuit 213 notifies the RTS frame generating circuit 214 that a self address is set in transmitting station address and an address of a transmitting station specified as CTS transmitting station is set in receiving station address.

The RTS frame generating circuit 214 has a function for requesting the radio LAN transmission circuit 215 to transmit the RTS frame signal following a transmission timing notified from the timing control circuit 211 and a function for generating the RTS frame in which set values notified from the duration setting circuit 112 and the address setting circuit 213 are set in each field and transferring to the radio LAN transmission circuit 215.

The RTS transmitting station specifying signal processing circuit 204 has a function for instructing the start/stop of the timing control circuit 211. More specifically, if it receives the RTS transmitting station specifying signal from the transmission control circuit 202, the RTS transmitting station specifying signal processing circuit 204 instructs the operation of the timing control circuit 211 and if it receives the RTS transmitting station specification releasing signal, it instructs the stop of the timing control circuit 211. If it receives the CTS transmitting station specifying signal from the transmission control circuit 202, the RTS transmitting station specifying signal processing circuit 204 notifies the address setting circuit 213 of an address of a specified CTS transmitting station.

The position information detecting circuit 205 has a function for detecting the position of the transmission unit and notifies the detected position information to the position information data signal generating circuit 206.

The position information data signal generating circuit 206 generates data signal for notifying position information notified from the position information detecting circuit 205 to the control station and transfers to the transmission control circuit 202.

Figure 6:
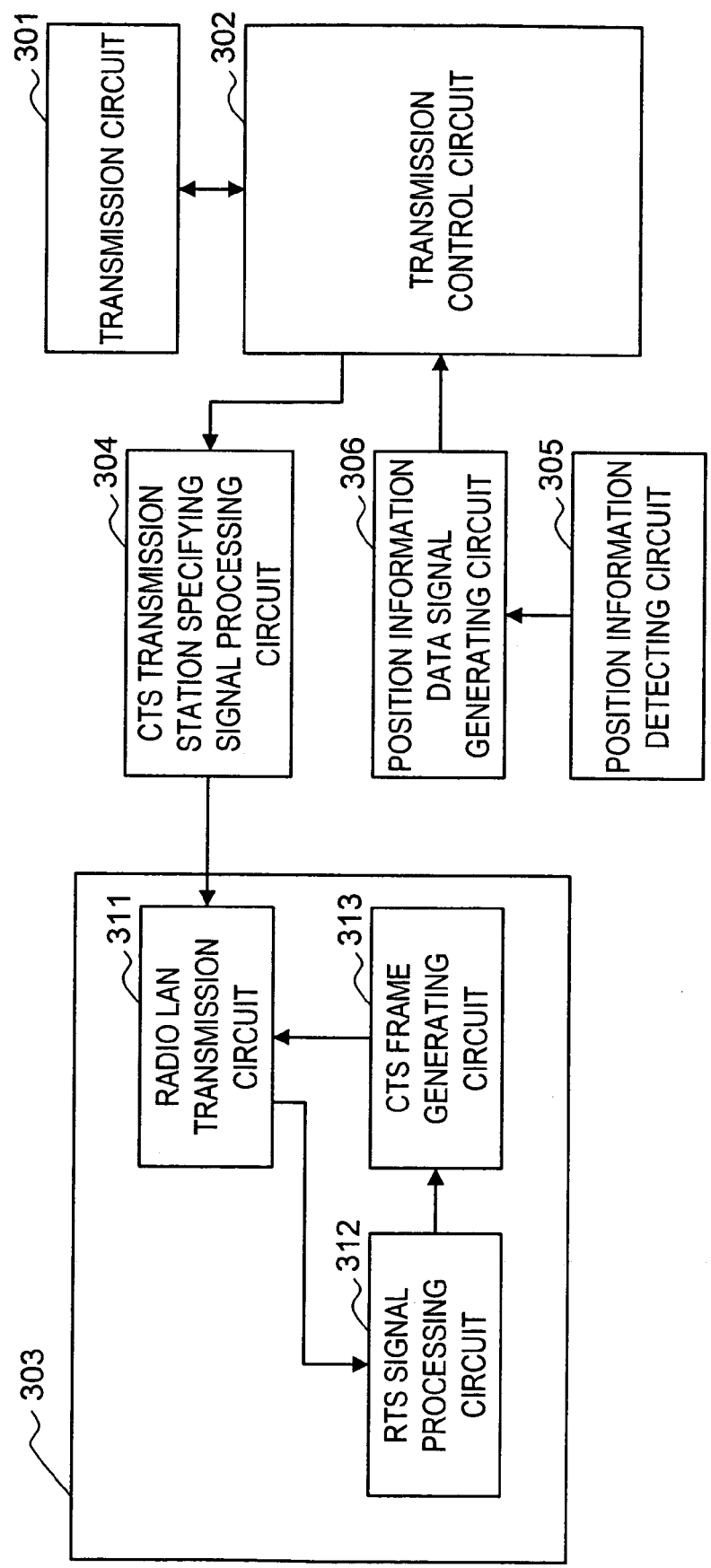
FIG. 6 is a block diagram showing the configuration of CTS transmission station in the transmission system according to the second embodiment.

FIG. 6 shows the configuration diagram of the CTS transmission station of this embodiment. The CTS transmitting station in this Figure is constituted of a transmitting circuit 301, a transmission control circuit 302, a to-radio LAN interference control circuit 303, a CTS transmitting station specifying signal processing circuit 304, a position information detecting circuit 305 and a position information data signal generating circuit 306.

Of them, the position information detecting circuit 305 and the position information data signal generating circuit 306 are equal to the position information detecting circuit 205 and the position information data signal generating circuit 206 of the RTS transmitting station.

In addition to the function of the transmission control circuit 102 in the transmission unit of the first embodiment the transmission control circuit 302 has a function for transferring reception data, especially, the CTS transmitting station specifying signal and the CTS transmitting station specification releasing signal to the CTS transmitting station specifying signal processing circuit 304 and a function for transferring a signal received from the position information data signal generating circuit 306 to the transmitting circuit 301 and making it transmit that data.

The to-radio LAN interference control circuit 303 is constituted of a radio LAN transmission circuit 311, a RTS signal processing circuit 312 and a CTS frame generating circuit 313.

The radio LAN transmission circuit 311 has a function for transmitting/receiving the radio LAN signal and transfers a received signal to the RTS signal processing circuit 312 while transmitting a CTS frame requested by the CTS frame generating circuit 313.

The RTS signal processing circuit 312 operates if a reception signal received from the radio LAN transmission circuit 311 is a RTS signal and has a function for extracting the value of a duration field and the value of transmission station address from the RTS signal and notifying it to the CTS frame generating circuit 313.

The CTS frame generating circuit 313 generates a CTS frame following the value notified from the RTS signal processing circuit 312 and requests the radio LAN transmission circuit 311 to transmit a generated CTS frame.

The CTS transmitting station specifying signal processing circuit 304 has a function for instructing the start/stop of the radio LAN transmission circuit 311. If it receives a CTS transmitting station specifying signal from the transmission control circuit 302, the CTS transmitting station specifying signal processing circuit 304 instructs the operation of the radio LAN transmission circuit 311 and if it receives a CTS transmitting station specification releasing signal, it instructs the stop of the radio LAN transmission circuit 311.

Figure 7:
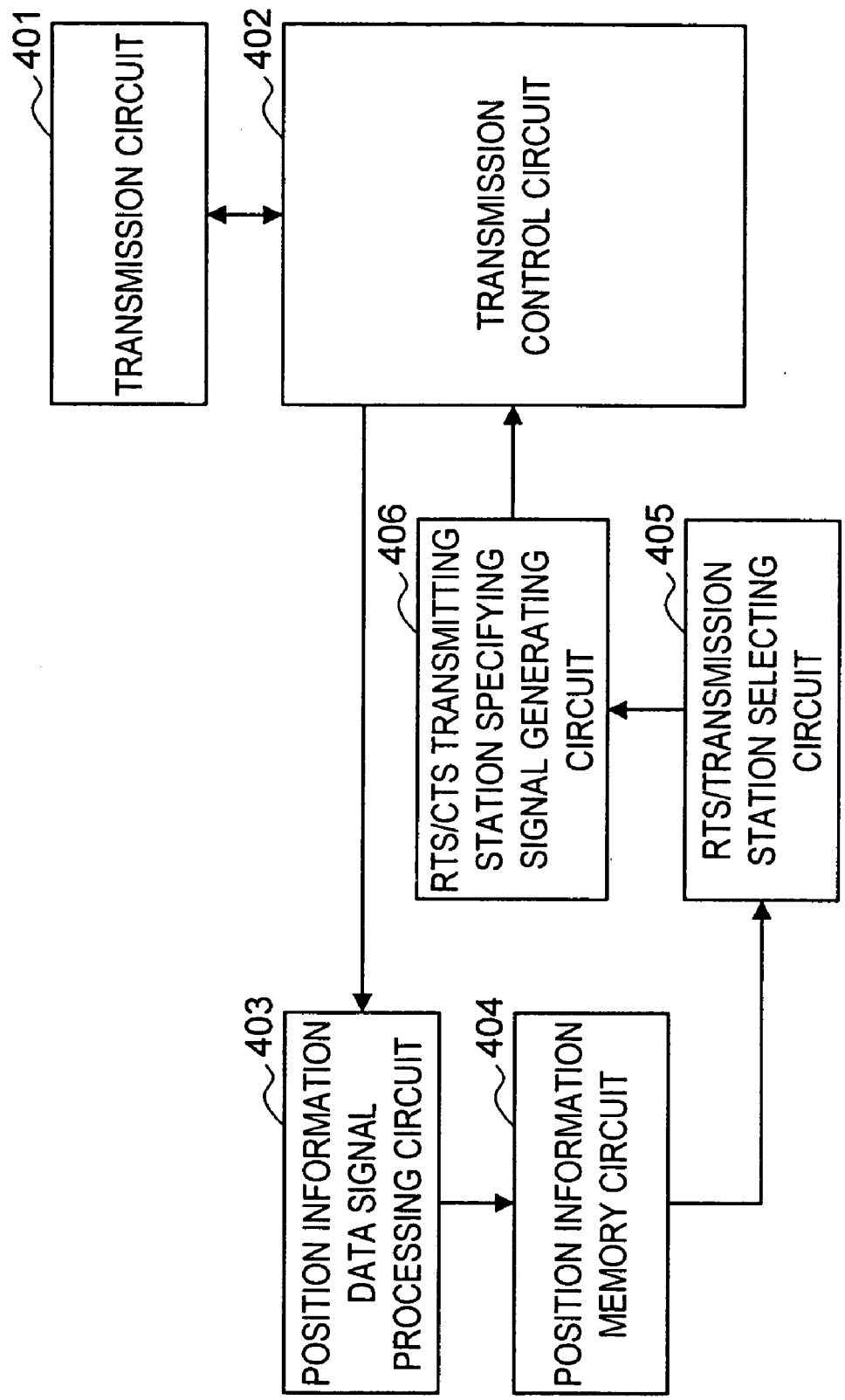
FIG. 7 is a block diagram showing the configuration of RTS/CTS transmission control station in the transmission system according to the second embodiment.

FIG. 7 shows the configuration diagram of the control station of this embodiment. The control station in this Figure is constituted of a transmission circuit 401, a transmission control circuit 402, a position information data signal processing circuit 403, a position information memory circuit 404, an RTS/CTS transmitting station selecting circuit 405 and an RTS/CTS transmitting station specifying signal generating circuit 406.

The transmission circuit 401 is equal to the transmission circuit in the transmission unit of the first embodiment.

In addition to the function of the transmission control circuit 102 in the transmission unit of the first embodiment, the transmission control circuit 402 has a function for transferring reception data, particularly the position information data signal to the position information data signal processing circuit 403 and a function for transferring a signal received from the RTS/CTS transmitting station specifying signal generating circuit 406 to the transmission circuit 401 and making it transmit the signal.

The position information data signal processing circuit 403, if it receives position information data from the transmission control circuit 402, registers the position of a transmission terminal that transmits that position information in the position information memory circuit 404.

The position information memory circuit 404 is a memory unit for storing the position information of a transmission terminal notified from the position information data signal processing circuit 403.

The RTS/CTS transmitting station selecting circuit 405 has a function for selecting the RTS transmitting station and the CTS transmitting station based on the position information of the transmission unit recorded in the position information memory circuit 404. This RTS/CTS transmitting station selecting circuit 405 selects a RTS transmitting station and a CTS transmitting station so as to increase a distance between the RTS transmitting station and the CTS transmitting station.

If the RTS transmitting station or CTS transmitting station selected by the RTS/CTS transmitting station selecting circuit 405 is changed, the RTS/CTS transmitting station specifying signal generating circuit 406 generates an RTS or a CTS transmitting station specification releasing signal to the RTS transmitting station or the CTS transmitting station before the change and an RTS or a CTS transmitting station specifying signal to the RTS transmitting station or CTS transmitting station after the change and transfers to the transmission control circuit 402.

Next, the operation of the transmission unit having the above-described structure will be described.

The operation of the transmission unit of this embodiment as a transmission unit of the self-transmission system is the same as the first embodiment.

In parallel to this transmission/reception operation, a following operation is carried out to avoid interference with the radio LAN system.

In the control station, the position information signal received from other transmitting station in the same system is transferred to the position information data signal processing circuit 403 by the transmission control circuit 402, processed by this position information data signal processing circuit 403 and the position information of a transmission station in the system is recorded in the position information memory circuit 404.

Next, the RTS/CTS transmitting station selecting circuit 405 selects a RTS transmitting station and a CTS transmitting station so as to increase a distance between the RTS transmitting station and the CTS transmitting station, based on the position information recorded in the position information memory circuit 404. The RTS/CTS transmitting station specifying signal generating circuit 406 generates a RTS transmitting station specifying signal and a CTS transmitting station specifying signal following an RTS transmitting station and CTS transmitting station selected by the RTS/CTS transmitting station selecting circuit 405 and transmits through the transmission control circuit 402 and the transmission circuit 401, the RTS transmitting station specifying signal to the selected RTS transmitting station and the CTS transmitting station specifying signal to the selected RTS transmitting station and CTS transmitting station respectively.

The control station, if it receives the position information of a new transmitting station, updates information memorized in the position information recording circuit 404 and investigates whether or not there is a pair of the RTS transmitting station and the CTS transmitting station which increases the distance between stations in the RTS/CTS transmitting station selecting circuit 405. If there is any one, the RTS transmitting station and/or the CTS transmitting station is changed and after a signal is generated by the RTS/CTS transmitting station specifying signal generating circuit 406, it is transmitted to a corresponding transmission station in a following manner. If the RTS transmitting station is changed, the RTS transmitting station specification releasing signal is transmitted to the RTS transmitting station before the change and the RTS transmitting station specifying signal is transmitted to the RTS transmitting station after the change. If the CTS transmitting station is changed, the CTS transmitting station specification releasing signal is transmitted to the CTS transmitting station before the change and then, the CTS transmitting station specifying signal is transmitted to the CTS transmitting station and the RTS transmitting station after the change.

In the RTS transmitting station that receives an RTS transmitting station specifying signal from the control station, if its signal is received by the RTS transmitting station specifying signal processing circuit 204, the RTS transmitting station specifying signal processing circuit 204 operates the timing control circuit 211. If the RTS transmitting station specification releasing signal from the control station is received, the operation of the timing control circuit 211 is stopped.

The timing control circuit 211 in the RTS transmitting station which receives the RTS transmitting station specifying signal, if it receives a transmission period from the transmission control circuit 202, obtains a period in which the transmission start time is accelerated by considering a time which can be required for the CSMA/CA prior to CTS transmission and a time required for the CTS transmission, notifies the duration setting circuit 212 of the length of this period and then, notifies the RTS frame generating circuit 214 of the start time of this period as an RTS transmission timing.

The RTS frame generating circuit 214, if an RTS frame transmission timing is reached, requests the radio LAN transmission circuit 215 to transmit an RTS frame. The radio LAN transmission circuit 215, if it receives an RTS frame transmission request, tries channel access following the CSMA/CA procedure and when the channel access is enabled, notifies the duration setting circuit 212 of time required by that time.

The duration setting circuit 212, at the same time when the above notification is made, notifies the RTS signal generating circuit 214 of a time obtained by subtracting a time notified from the radio LAN transmission circuit 215 from the length of a period notified form the timing generating circuit 211 as a value to be set in the duration field of the RTS. Further, the address setting circuit 213 notifies the RTS signal generating circuit 214 of an address as a transmitting station address and an address of a transmitting station specified as the CTS transmitting station as an address of a receiving station as a value of the RTS address field. The RTS signal generating circuit 214 generates an RTS signal based on these values and transfers to the radio LAN transmission circuit 215.

The radio LAN transmission circuit 215 receives an RTS frame in which the values of duration field and address field are set to the above-mentioned values from the RTS frame generating circuit 214 and transmits the RTS.

The CTS transmitting station which receives a CTS transmitting station specifying signal from the control station operates the radio LAN transmission circuit 311 based on a specification of the CTS transmitting station specifying signal processing circuit 304. If a CTS transmitting station specification releasing signal is received from the control station, the operation of the radio LAN transmission circuit 311 is stopped.

In the CTS transmitting station which receives the CTS transmitting station specifying signal and operates the radio LAN transmission circuit 311, if an RTS signal is received by the radio LAN transmission circuit 311, the RTS signal processing circuit 312 extracts the value of a duration field and the value of a receiving station address from the RTS signal. The CTS frame generating circuit 313 generates a CTS frame in which these values are set and transmits through the radio LAN transmission circuit 311.

When the radio LAN transmission unit located within a radio LAN transmission range from the aforementioned RTS transmitting station or the CTS transmitting station, receives an RTS signal or CTS signal from this RTS transmitting station or CTS transmitting station, it operates to inhibit transmission of a signal in the period indicated by the duration field. In this period, any signal that originates in interference is never transmitted. Consequently, the self-transmission system is capable of transmitting without being interfered by the radio LAN.

Effect

According to the transmission system of the second embodiment of the present invention, by transmitting an RTS signal and a CTS signal prior to the transmission period, the radio LAN transmission unit which receives at least any one of the RTS signal and the CTS signal, operates to inhibit the transmission of a signal in the transmission period of the self-transmission system and thus, the self-transmission unit is capable of transmitting without being interfered by the radio LAN transmission unit.

Particularly by transmitting the RTS signal and CTS signal from two stations located as far away from each other as possible, the range which allows the RTS signal or CTS signal to be received and inhibits transmission of the radio LAN signal is expanded more than the transmission unit of the first embodiment, so that being interfered by the radio LAN system can be suppressed effectively.

Third Embodiment

The transmission system of this embodiment is so constructed as to allow selection of the RTS transmitting station and the CTS transmitting station carried out by the control station in the transmission system of the second embodiment to be executed by the RTS transmitting station and CTS transmitting station for themselves.

Figure 8:
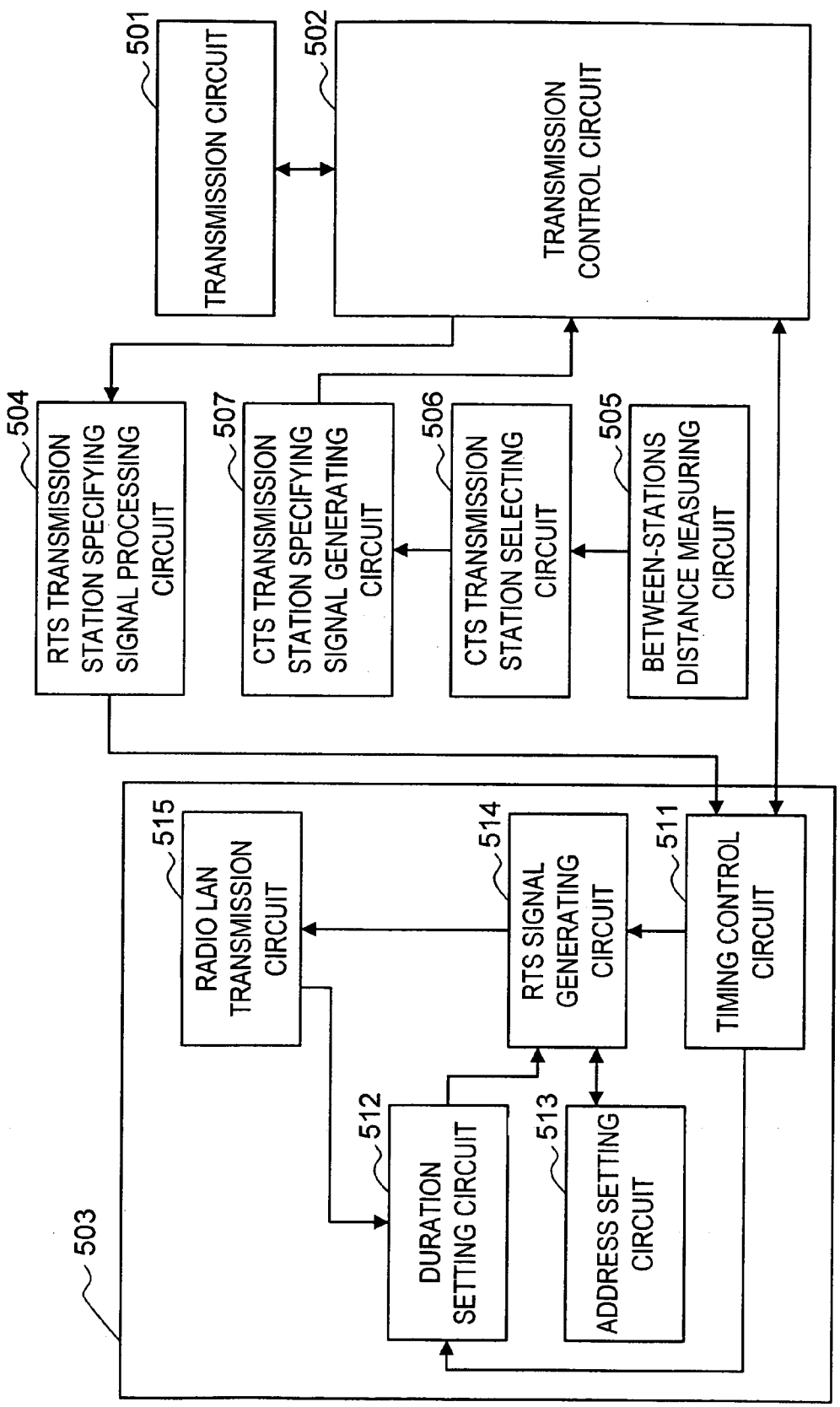
FIG. 8 is a block diagram showing the configuration of RTS transmission station in the transmission system according to a third embodiment.

FIG. 8 shows the configuration diagram of the RTS transmitting station according to the third embodiment of the present invention. The RTS transmitting station in the same Figure is constituted of a transmission circuit 501, a transmission control circuit 502, a to-radio LAN interference control circuit 503, an RTS transmitting station specifying signal processing circuit 504, a between-stations distance measuring circuit 505, a CTS transmitting station selecting circuit 506 and a CTS transmitting station specifying signal generating circuit 507.

The transmission circuit 501 is the same as the transmission circuit 101 in the transmission unit of the first embodiment.

In addition to a function of the transmission control circuit 102 in the transmission unit of the first embodiment, the transmission control circuit 502 has a function for transferring reception data, particularly the RTS transmitting station specifying signal and the RTS transmitting station specification releasing signal to the RTS transmitting station specifying signal processing circuit 504 and a function for transferring a signal received from the CTS transmitting station specifying signal generating circuit 507 to the transmission circuit 501 and making it transmit that signal.

The to-radio LAN interference control circuit 503 and the RTS transmitting station specifying signal processing circuit 504 are the same as the to-radio LAN interference control circuit 203 and the RTS transmitting station specifying signal processing circuit 204 in the RTS transmitting station of the second embodiment.

The between-stations distance measuring circuit 505 has a function for measuring a distance between a self-station and an arbitrary transmitting station. This between-stations distance measuring circuit 505 notifies the CTS transmitting station selecting circuit 506 of a measured distance between transmitting stations. The measurement of the distance can be carried out by estimating from the attenuation amount of a received power from a signal transmitted by, for example, a measuring object transmitting station. The reason is that the distance and the attenuation amount are in substantially inversely proportional relationship.

The CTS transmitting station selecting circuit 506 selects a CTS transmitting station based on the measured distance by the between-stations distance measuring circuit 505. That is, a distance between a currently specified CTS transmitting station and self station is compared with a distance relative to a newly measured transmitting station and if there is found a transmitting station farther than the current distance, the CTS transmitting station is changed and it is notified to the CTS transmitting station specifying signal generating circuit 507.

The CTS transmitting station specifying signal generating circuit 507, if the CTS transmitting station for selecting the CTS transmitting station selecting circuit 506 is changed, generates a CTS transmitting station specification releasing signal to a CTS transmitting station before the change and a CTS transmitting station specifying signal to a CTS transmitting station after the change and transfers to the transmission control circuit 502.

Figure 9:
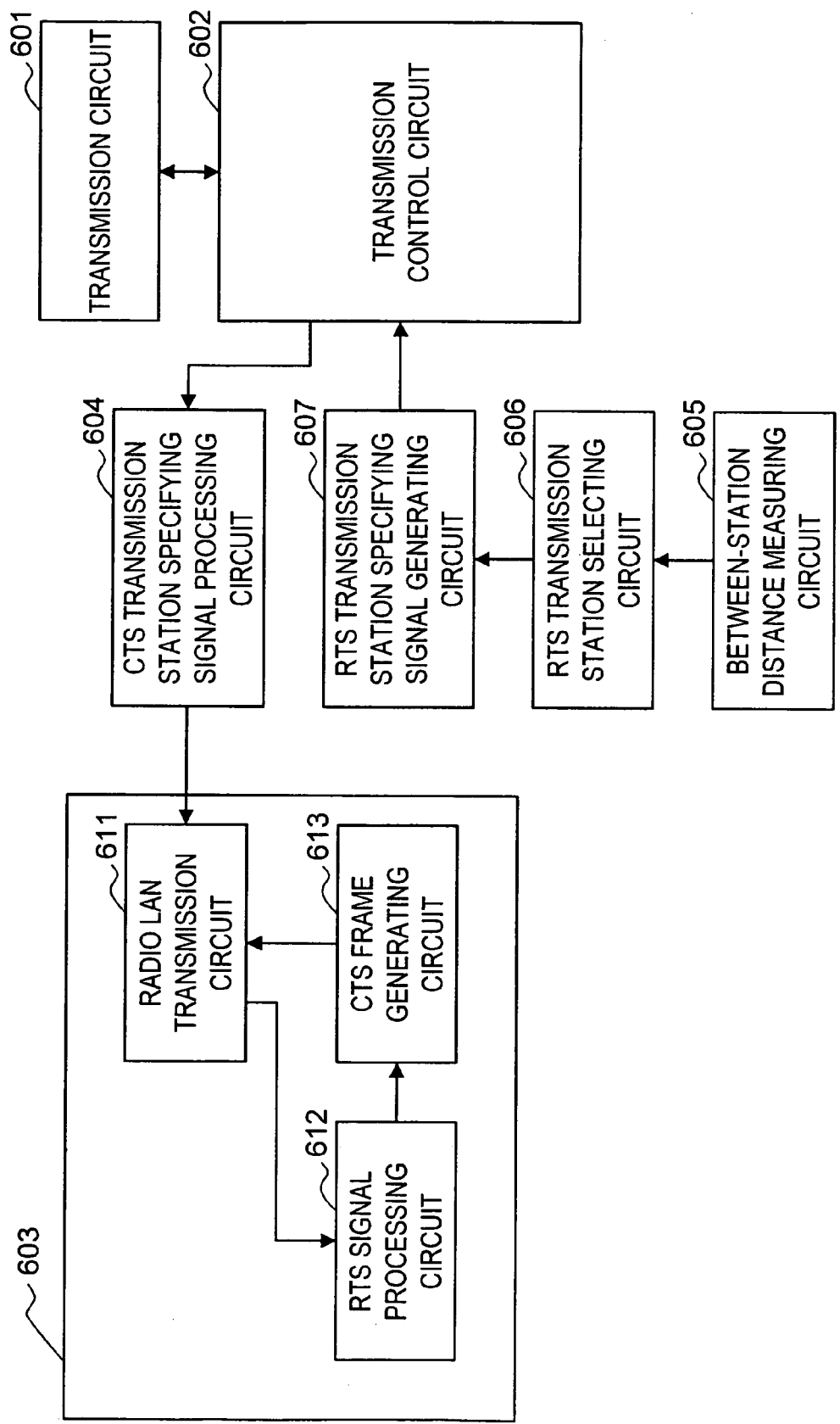
FIG. 9 is a block diagram showing the configuration of CTS transmission station in the transmission system according to the third embodiment.

FIG. 9 is a configuration diagram of the CTS transmitting station according to the third embodiment of the present invention. The CTS transmitting station in the same Figure is constituted of a transmission circuit 601, a transmission control circuit 602, a to-radio LAN interference control circuit 603, a CTS transmitting station specifying signal processing circuit 604, a between-stations distance measuring circuit 605, an RTS transmitting station selecting circuit 606 and an RTS transmitting station specifying signal generating circuit 607.

The transmitting circuit 601 is the same as the transmitting circuit 101 in the transmission unit of the first embodiment.

In addition to the function of the transmission control circuit 102 in the transmission unit of the first embodiment, the transmission control circuit 602 has a function for transferring reception data, particularly the CTS transmitting station specifying signal and the CTS transmitting station specification releasing signal to the CTS transmitting station specifying signal processing circuit 604 and a function for transferring a signal received from the RTS transmitting station specifying signal generating circuit 607 to the transmitting circuit 601 and making it transmit that signal.

The to-radio LAN interference control circuit 603 and the CTS transmitting station specifying signal processing circuit 604 are the same as the to-radio LAN interference control circuit 303 and the CTS transmitting station specifying signal processing circuit 304 in the CTS transmitting station of the second embodiment.

The between-stations distance measuring circuit 605 is the same as the between-stations distance measuring circuit 505 of the RTS transmitting station.

The RTS transmitting station selecting circuit 606 is a circuit for selecting an RTS transmitting station based on the distance measured by the between-stations distance measuring circuit 605. As the RTS transmitting station, a transmitting station as far from the self-station as possible is selected. That is, if there is found a transmitting station farther than the currently specified RTS transmitting station, the RTS transmitting station is changed.

When there is a change in the RTS transmitting station that RTS transmitting station selecting circuit 606 selects, the RTS transmitting station specifying signal generating circuit 607 generates an RTS transmitting station specification releasing signal to an RTS transmitting station before the change and an RTS transmitting station specifying signal to an RTS transmitting station after the change and transfers to the transmission control circuit 602.

Operation

Next, the operation of this embodiment will be described. Because it is the same as the operation of the second embodiment except operations for selecting the RTS transmitting station and the CTS transmitting station of this embodiment, only the operations for selecting the RTS transmitting station and CTS transmitting station will be described.

In the transmission system of this embodiment, there exists no control station for specifying the RTS transmitting station and CTS transmitting station. Thus, a default RTS transmitting station and CTS transmitting station are specified preliminarily.

The RTS transmitting station, if it recognizes a new transmitting station, measures a distance from the self transmitting station with the between-stations distance measuring circuit 505 and notifies the CTS transmitting station selecting circuit 506. The CTS transmitting station selecting circuit 506, if the notified distance is longer than the distance relative to the current CTS transmitting station, the CTS transmitting station is changed. If the CTS transmitting station is changed, the CTS transmitting station specifying signal generating circuit 507 generates a CTS transmitting station specification releasing signal to a CTS transmitting station before the change and a CTS transmitting station specifying signal to a CTS transmitting station after the change and transmits through the transmission control circuit 502.

The CTS transmitting station, if it recognizes a new transmitting station, measures a distance relative to the self transmitting station with the between-stations distance measuring circuit 605 and notifies to the RTS transmitting station selecting circuit 606. The RTS transmitting station selecting circuit 606, if the notified distance is longer than a distance relative to the current RTS transmitting station, changes the RTS transmitting station. When the RTS transmitting station is changed, the RTS transmitting station specifying signal generating circuit 607 generates an RTS transmitting station specification releasing signal to an RTS transmitting station before the change and an RTS transmitting station specifying signal to an RTS transmitting station after the change and transmits through the transmission control circuit 602 and the transmission circuit 601.

In the above-described manner, the RTS transmitting station and CTS transmitting station are selected so that the distance between the RTS transmitting station and the CTS transmitting station is increased without any control station.

Effect

As described above, the transmission system of this embodiment is capable of obtaining the same effect as the second embodiment even if no control station is provided within transmission system.

Fourth Embodiment

The to-radio LAN interference control unit of this embodiment is a transmission timing adjusting unit capable of suppressing being interfered by the radio LAN system by providing within transmission area of a transmission system for operating a transmission circuit intermittently synchronous with a beacon signal transmitted periodically by the main station and operating the same transmission system.

Figure 10:
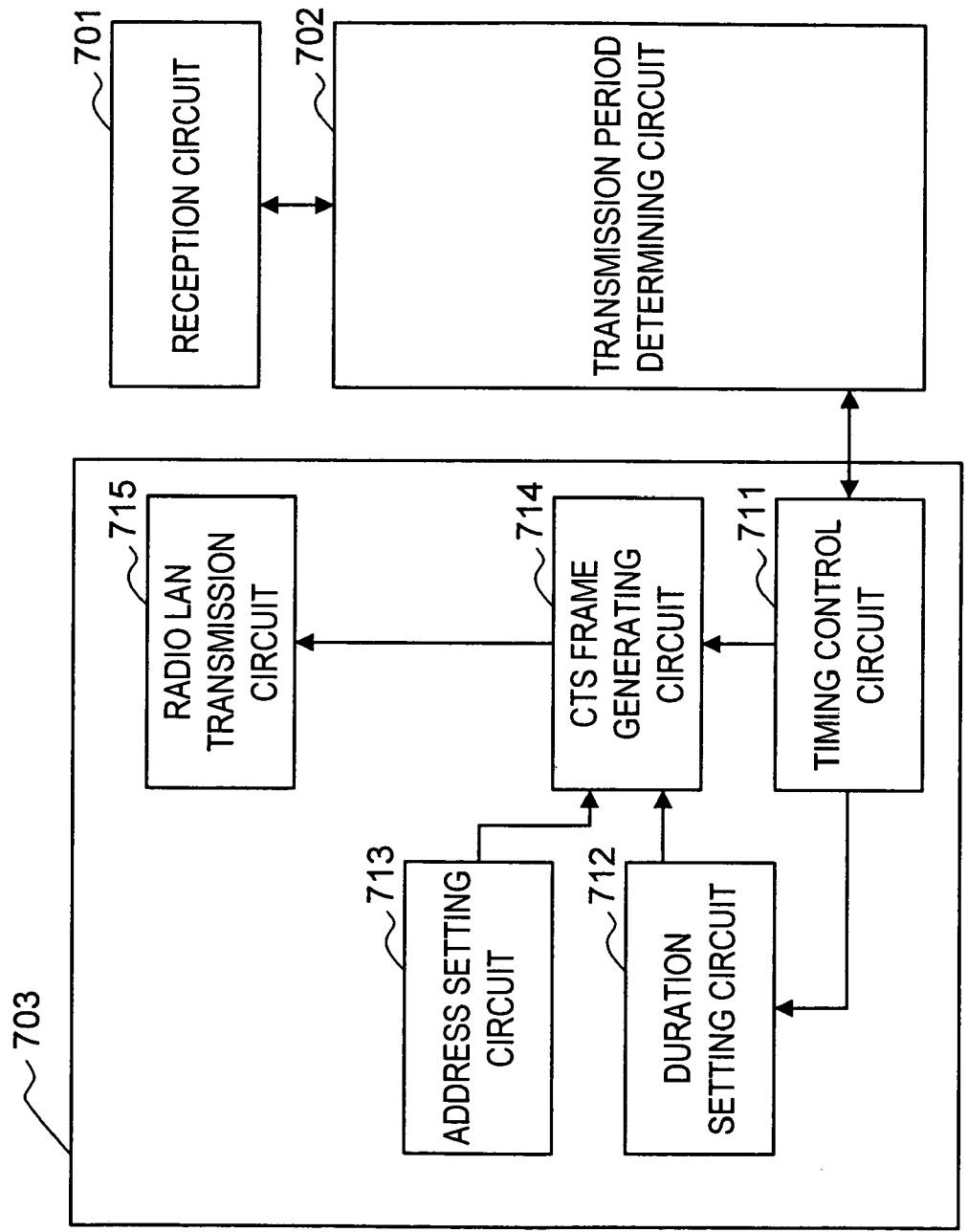
FIG. 10 is a block diagram showing the configuration of radio LAN interference control unit according to a fourth embodiment.

FIG. 10 is a configuration diagram of a to-radio LAN interference control unit according to the fourth embodiment of the present invention. The to-radio LAN interference control unit in the same Figure is constituted of a reception circuit 701, a transmission period determining circuit 702 and a to-radio LAN interference control circuit 703.

The to-radio LAN interference control circuit 703 is substantially the same as the to-radio LAN interference control circuit 103 in the transmission unit of the first embodiment.

The reception circuit 701 has a function for accessing a transmission unit following transmission method of its self-transmission system and receiving a transmission signal.

The transmission period determining circuit 702 determines a transmission period that enables transmission with its self-transmission system and notifies the to-radio LAN interference control circuit 703.

Operation

Next, the operation of the to-radio LAN interference control unit of this embodiment will be described. Because the operation of the to-radio LAN interference control circuit 703 of this embodiment is substantially the same as the to-radio LAN interference control circuit 103 of the first embodiment, only the operation for determining a transmission period to be notified to the to-radio LAN interference control circuit 703 will be described.

In the transmission period determining circuit 702, synchronism with a beacon signal to be received by the reception circuit 701 is established and the operation period of the transmission circuit is detected. A detected operation period is determined as transmission period of the self-transmission system and notified to the to-radio LAN interference control circuit 703. The to-radio LAN interference control circuit 703 avoids being interfered by the radio LAN system by the same operation as the to-radio LAN interference control circuit 103 in the transmission unit of the first embodiment.

Effect

Because the to-radio LAN interference control unit is provided within transmission area of transmission system constituted of an existing transmission unit, it is capable of avoiding being interfered by the radio LAN transmission system by adjusting the transmission timing without improvement of the existing transmission unit.

Modification

Although the transmission unit of the first embodiment and the to-radio LAN interference control unit 103, 703 of the fourth embodiment inhibit transmission of the radio LAN transmission unit by transmitting the CTS signal, the RTS signal may be transmitted instead of the CTS signal.

In the second embodiment and the third embodiment, the transmission circuit and the transmission control circuit of the RTS transmitting station, the CTS transmitting station and the control station may be replaced with the reception circuit and the transmission period determining circuit of the fourth embodiment.

Although according to the fourth embodiment, the duration setting circuit 712 sets a duration time without fetching in any signal from the radio LAN transmission circuit 715, needless to say, a signal from the radio LAN transmission circuit 715 may be fetched in and corrected like the first embodiment.

In these cases also, the same operation and effect as the above-described respective embodiments can be exerted.

What is claimed is:

1. A radio transmission unit for transmitting according to second radio transmission system which transmits/receives data signal through the same frequency band as first radio transmission system in which a transmission station transmits a transmission request signal prior to transmitting data signal, while a reception station receiving the transmission request signal sends back a reception preparation completion signal, said radio transmission unit comprising: CTS transmitting means for transmitting the reception preparation completion signal based on said first radio transmission system; and duration setting means for setting a duration time to be overlaid on said reception preparation completion signal, wherein prior to starting transmission by said second radio transmission system, said duration time set by said duration setting means is overlaid on the reception preparation completion signal of said first radio transmission system.

2. The radio transmission unit according to claim 1, wherein said duration setting means sets a time presented by adding a time which can be required for pre-treatment for transmitting the reception preparation completion signal according to said first radio transmission system to a time required for said second radio transmission system to transmit after said reception preparation completion signal is transmitted as a margin, as a duration time.

3. The radio transmission unit according to claim 2, wherein said CTS transmitting means has a function for notifying said duration setting means of a time consumed in a processing for transmitting the signal before said reception preparation completion signal is transmitted, and said duration setting means has a function for correcting said duration time based on a time notified form said CTS transmitting means.

4. A radio transmission unit for transmitting according to second radio transmission system which transmits/receives data signal under the same frequency band as first radio transmission system in which a transmission station transmits a transmission request signal prior to transmitting data signal, while a reception station receiving the transmission request signal sends back a reception preparation completion signal, said radio transmission unit comprising: RTS transmitting means for transmitting a transmission request signal based on said first radio transmission system; and duration setting means for setting a duration time to be overlaid on said transmission request signal, wherein prior to starting transmission by said second radio transmission system, said duration time set by said duration setting means is overlaid on the transmission request signal based on said first radio transmission system.

5. The radio transmission unit according to claim 4, wherein said duration setting means sets a time presented by adding a time which can be required for pre-treatment for transmitting the transmission request signal according to said first radio transmission system to a time required for said second radio transmission system to transmit after said transmission request signal is transmitted as a margin, as a duration time.

6. The radio transmission unit according to claim 5, wherein said RTS transmitting means has a function for notifying a time consumed in a processing for transmitting the signal to said duration setting means before said transmission request signal is transmitted, and said duration setting means has a function for correcting said duration time based on a time notified from said RTS transmitting means.

7. The radio transmission unit according to claim 4, further comprising RTS transmitting station specifying signal processing means for controlling the transmission operation of said transmission request signal by receiving a signal which instructs start/stop of the transmission operation of a transmission request signal based on said second radio transmission system.

8. The radio transmission unit according to claim 7, further comprising: means for detecting the position of said radio transmission unit and means for notifying a position detected by said means to a radio transmission terminal having control function according to said second radio transmission system.

9. The radio transmission unit according to claim 4, further comprising: an RTS transmission station specifying signal processing means for controlling the operation for transmitting a transmission request signal by receiving a signal that instructs start/stop of the transmission operation of a transmission request signal according to said second radio transmission system; means for measuring a distance between a self-transmission unit and another radio transmission terminal; means for selecting a radio transmission terminal which transmits a reception preparation completion signal corresponding to the measured distance; and means for transmitting a signal which instructs start/stop of the transmission operation of a reception preparation completion signal corresponding to a selected radio transmission terminal.

10. A radio transmission unit for transmitting according to second radio transmission system which transmits/receives data signal under the same frequency band as first radio transmission system in which a transmission station transmits a transmission request signal prior to transmitting data signal, while a reception station receiving the transmission request signal sends back a reception preparation completion signal, said radio transmission unit comprising: radio transmitting means for transmitting/receiving a signal based on said first radio transmission system; RTS signal processing means for extracting the value of duration field and the value of a transmission station address from a transmission request signal destined for a self-transmission unit in a signal received according to said first radio transmission system; and CTS generating means for generating a reception preparation completion signal using information extracted by the RTS signal processing means and transmitting according to the first radio transmission system.

11. The radio transmission unit according to claim 10, further comprising CTS transmitting station specifying signal processing means for controlling the send-back operation of the reception preparation completion signal by receiving a signal which instructs start/stop of the send-back operation of the reception preparation completion signal according to said second radio transmission system.

12. The radio transmission unit according to claim 10, further comprising: means for detecting the position of a radio transmitting terminal; and means for notifying said radio transmitting terminal specified preliminarily by said second radio transmission system of the detected position.

* * * * *